US012646521B2

(12) United States Patent
Sharma et al.

(10) Patent No.: US 12,646,521 B2
(45) Date of Patent: Jun. 2, 2026

(54) CONVERSATIONAL INTERFACE AND METHOD FOR INTERACTION WITH COMMUNICATION DEVICES

(71) Applicant: Vail Systems, Inc., Deerfield, IL (US)

(72) Inventors: Nikhita Sharma, Chicago, IL (US); Joseph R. Smetana, Naperville, IL (US); David J. Fruin, La Grange Park, IL (US); Vijay K. Gurbani, Lisle, IL (US)

(73) Assignee: Vail Systems, Inc., Deerfield, IL (US)

( * ) Notice: Subject to any disclaimer, the term of this patent is extended or adjusted under 35 U.S.C. 154(b) by 284 days.

(21) Appl. No.: 18/047,904

(22) Filed: Oct. 19, 2022

(65) Prior Publication Data

US 2023/0127163 A1    Apr. 27, 2023

Related U.S. Application Data

(60) Provisional application No. 63/262,930, filed on Oct. 22, 2021.

(51) Int. Cl.
*G10L 17/22* (2013.01)
*H04M 3/493* (2006.01)

(52) U.S. Cl.
CPC .......... *G10L 17/22* (2013.01); *H04M 3/4936* (2013.01)

(58) Field of Classification Search
CPC ...... G10L 17/22; H04M 3/493; H04M 3/4936
See application file for complete search history.

(56) References Cited

U.S. PATENT DOCUMENTS

| | | | |
|---|---|---|---|
| 10,387,963 B1 | 8/2019 | Leise et al. | |
| 11,874,904 B2 * | 1/2024 | Yoon ...................... | G06F 21/31 |
| 2009/0022155 A1 | 1/2009 | Rosenberg et al. | |
| 2010/0053187 A1 | 3/2010 | Arrasvuori et al. | |

(Continued)

OTHER PUBLICATIONS

International Search Report and Written Opinion issued in PCT/US22/78430, mailed on Mar. 6, 2023.

(Continued)

*Primary Examiner* — Richemond Dorvil
*Assistant Examiner* — Ethan Daniel Kim
(74) *Attorney, Agent, or Firm* — ICE MILLER LLP; Safet Metjahic

(57) ABSTRACT

A method and a system for interacting with one or more computer resource assets at a location. The system includes a processor, a storage, and an interface suite including a first interface configured to communicate with a user device and a second interface configured to interact with at least one computing resource asset at the location. The process is configured to receive a call, via the first interface, from the user device, the call being directed to a destination phone number, provide a conversational avatar by a machine learning platform based on the destination phone number, operate the conversational avatar by the machine learning platform to communicate with the user device and interact with a user of the user device using conversational language, generate by the machine learning platform a command to perform an operation or a function, and send, based on one or more words or sounds spoken during the interaction with the user, the command to a computing resource asset at the location to perform the operation or the function.

20 Claims, 4 Drawing Sheets

(56) References Cited

U.S. PATENT DOCUMENTS

| | | | |
|---|---|---|---|
| 2015/0017958 A1 | 1/2015 | Kang et al. | |
| 2018/0158458 A1* | 6/2018 | Weber | G10L 15/1815 |
| 2019/0189120 A1* | 6/2019 | Sohn | G10L 15/22 |
| 2019/0219976 A1* | 7/2019 | Giorgi | G10L 17/06 |
| 2021/0120121 A1* | 4/2021 | McCourt | G10L 15/197 |
| 2024/0273411 A1* | 8/2024 | Mueck | H04L 9/3263 |

OTHER PUBLICATIONS

Supplementary Partial EP Search Report issued in EP 22 88 4690, dated Jul. 16, 2025.

* cited by examiner

CONVERSATIONAL INTERFACE AND METHOD FOR INTERACTION WITH COMMUNICATION DEVICES

CROSS-REFERENCE TO RELATED APPLICATION

This application claims priority to and the benefit of provisional U.S. Patent Application No. 63/262,930, filed Oct. 22, 2021, which is hereby incorporated herein by reference in its entirety.

FIELD OF THE DISCLOSURE

The present disclosure relates to a method, a system and a computer program for interfacing and interacting with diverse communication devices, and, more particularly, for interfacing and interacting with diverse communication devices, such as, for example, Internet-of-Things (IoT) devices, using broader intelligence, including natural language processing.

BACKGROUND OF THE DISCLOSURE

Improvements in software-based conversational interactions have opened a range of opportunities for speech-enabled interactive services and devices. Familiarity with "smart" devices that can be interacted with via speech, such as, for example, Siri®, Alexa®, or Cortana®, have created an expectation that a user can request an answer to a question, or invoke an automated action using speech, even if the mode of interaction is sometimes limited to specific commands and to the device's pre-programmed "skills." There exists an unfulfilled need for a broader intelligence methodology and system that can interface and interact with diverse communication devices, including but not limited to, for example, IoT devices and smartphones.

SUMMARY OF THE DISCLOSURE

The disclosure provides a novel and non-obvious broader intelligence system, methodology and computer program. In a non-limiting embodiment, the broader intelligence system comprises: a processor; a natural language processor; a storage; and an interface suite comprising an interface configured to interact with a user device (such as, for example, a phone) and an interface configured to interact with at least one computing resource asset, wherein the processor is configured to: generate an artificial intelligence avatar associated with, for example, a phone number, a chat session, a text message (for example, Facebook Messenger channel, an SMS (Short Message Service) message, a Whatsapp message, or a multimedia communication message) or session; operate the artificial intelligence avatar and interact with the user device using conversational language; and exchange data or commands with the at least one computing resource asset based on the interaction using conversational language.

In a non-limiting embodiment, the disclosure provides a computer-implemented method, comprising: receiving a call from a registered user device, the call including a phone number; generating an artificial intelligence avatar associated with the phone number; interacting, via the artificial intelligence avatar, with the user device using conversational language; and exchanging data or commands with at least one computing resource asset based on the interaction using conversational language.

In a non-limiting embodiment, the disclosure provides a non-transitory computer-readable medium containing computer-executable instructions that, when executed by a processor, cause the processor to perform steps comprising: receiving a call from a registered user device, the call including a phone number; generating an artificial intelligence avatar associated with the phone number; interacting, via the artificial intelligence avatar, with the user device using conversational language; and exchanging data or commands with at least one computing resource asset based on the interaction using conversational language.

In a non-limiting embodiment, the disclosure provides a computer-implemented method for interacting with one or more computer resource assets at a location. The method comprises: receiving a call from a user device, the call including a destination phone number; generating an artificial intelligence avatar associated with the destination phone number; interacting, via the artificial intelligence avatar, with the user device using conversational language; generating, via the artificial intelligence avatar, a command to perform an operation or a function; and sending, based on one or more words or sounds spoken during the interaction, the command to a computing resource asset at the location to perform the operation or the function. The computer-implemented method can further comprise: authenticating the call by the artificial intelligence avatar; authenticating the call by a call authentication computing resource asset configured to apply at least one authentication technology; and/or terminating the call based on comparing a voice signature to a stored voice signature.

In the computer-implemented method: the at least one authentication technology can comprise an HTTP authentication technology, including at least one of a Basic, a Bearer, a Digest, or a Mutual HTTP authentication technology; or the at least one authentication technology can comprise a shared-secrets or a limited time-to-live authentication token; the at least one authentication technology can comprise a voice print authentication technology; or the voice print authentication technology can include comparing a voice signature to a stored voice signature; or the voice signature can comprise a voice print, and wherein the call is terminated when a user's voice does not match a stored voice signature corresponding to the user.

A non-limiting embodiment includes a computer-implemented method for interacting with one or more computer resource assets at a location, the method comprising: generating an artificial intelligence avatar associated with a destination phone number; initiating an outbound call from the destination phone number to a user device; interacting, by the artificial intelligence avatar, with the user device using conversational language; authenticating, by the artificial intelligence avatar, an identity of a user of the user device; and, asking, by the artificial intelligence avatar, for a registered user of the user device before announcing a reason for the call.

A non-limiting embodiment includes a system for interacting with one or more computer resource assets at a location. The system comprises: a processor; a storage; and an interface suite including a first interface configured to communicate with a user device and a second interface configured to interact with at least one computing resource asset at the location, wherein the processor is configured to: (i) receive a call, via the first interface, from the user device, the call being directed to a destination phone number; (ii) provide a conversational avatar by a machine learning platform based on the destination phone number; (iii) operate the conversational avatar by the machine learning platform to communicate with the user device and interact with a user of the user device using conversational language; (iv) generate by the machine learning platform a command to perform an operation or a function; and (v) send, based on one or more words or sounds spoken during the interaction with the user, the command to a computing resource asset at the location to perform the operation or the function.

In the system, the processor can be configured to authenticate the call by the conversational avatar or a call authentication computing resource asset configured to apply at least one authentication technology.

In the system, the at least one authentication technology can comprise an HTTP authentication technology, including at least one of a Basic, a Bearer, a Digest, or a Mutual HTTP authentication technology.

In the system, the at least one authentication technology can comprise a shared-secrets or a limited time-to-live authentication token or a voice print authentication technology. The voice print authentication technology can include comparing a voice signature to a stored voice signature.

In the system, the processor can be configured to terminate the call based on comparing the voice signature to the stored voice signature. The voice signature can comprise a voice print, and wherein the call is terminated when a user's voice does not match a stored voice signature corresponding to the user.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
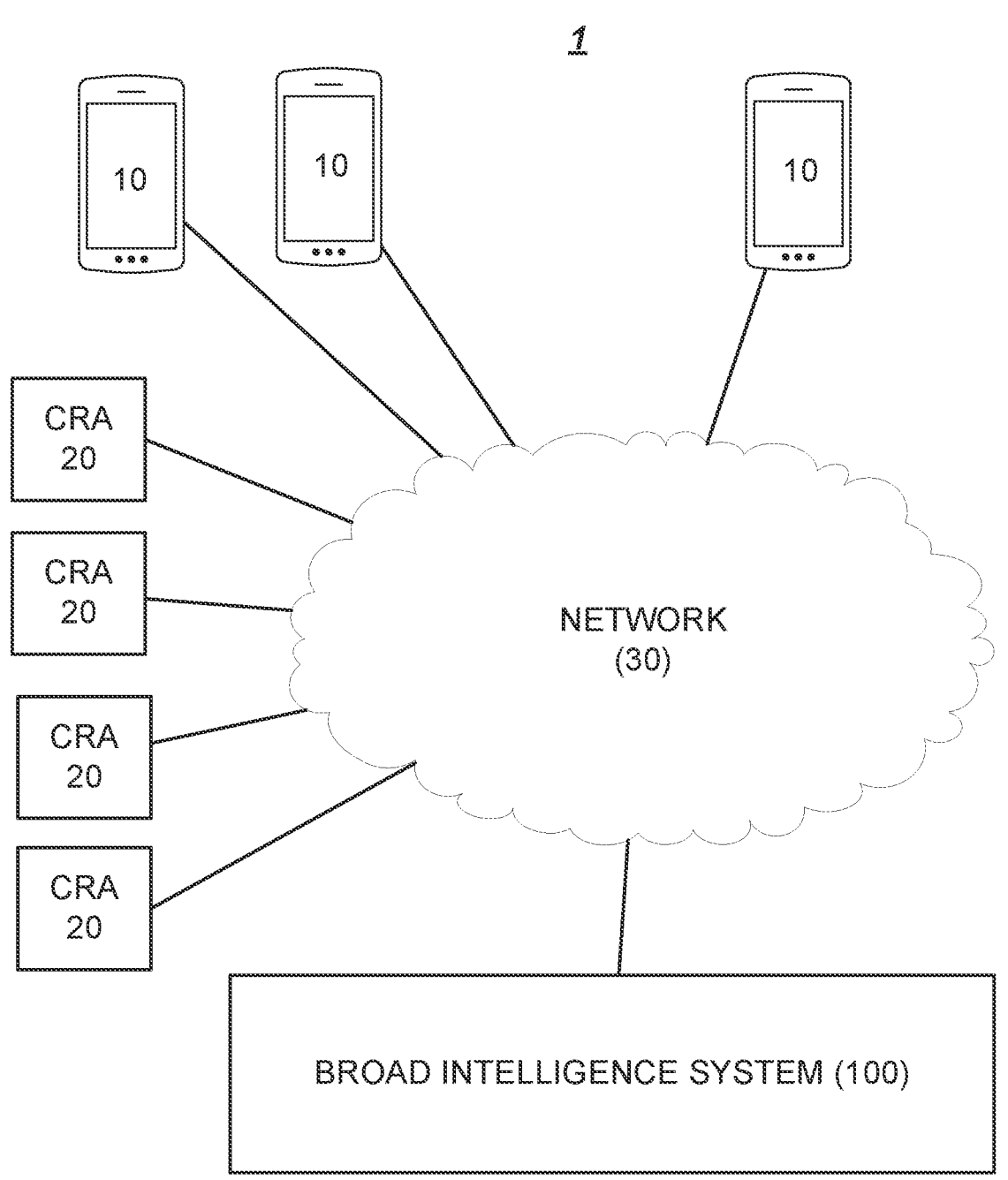
FIG. 1 illustrates an example of a user environment, including a non-limiting embodiment of a broad intelligence (BI) system constructed according to the principles of the disclosure.

The present disclosure is further described in the detailed description that follows.

DETAILED DESCRIPTION OF THE DISCLOSURE

The disclosure and its various features and advantageous details are explained more fully with reference to the nonlimiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Existing software-based conversational agents that include speech-enabled interactive systems, such as, for example, Siri®, Alexa®, or Cortana®, are unable to interface or interact with the various diverse communication devices currently in use. Such agents have limited ability to receive or make Voice-over-IP (VoIP or voice-over-internet-protocol) calls and, in many cases, require access directly in the location where they are installed. In addition, the conversational agents' ability to invoke an action ("skill"), such as, for example, ordering food or making a reservation at a restaurant, are usually highly specific, use the World Wide Web (WWW) protocols, and are not able to act in a generalized sense, such as, for example, allowing a user to order a pizza from a previously undetermined pizza vendor. External actions require specific knowledge that is local to the skill and the user cannot interact in a generalizable fashion that builds the external connection details dynamically.

Familiarity with conversational agents that can be interacted with via speech have created an expectation that a user can request an answer to a question or invoke an action using speech, even if the mode of interaction is sometimes limited to specific commands and to the conversational agent's pre-programmed skills. However, such existing software-based conversational agents are incapable of interfacing or interacting in a complex manner with computer resource assets (CRAs), such as, for example, an IoT devices or a sensor hardware device, essentially taking non-related events into an actionable item. Moreover, such conversational agents are incapable of autonomously gleaning specific knowledge that is local to the skill of a particular CRA and facilitating interaction between the CRA and a user (such as, for example, via a user device) in a generalizable fashion that builds the necessary connection details dynamically. For instance, existing software-based conversational agents cannot interact in a complex manner with IoT devices, such as, for example, where a sump pump is not working; the existing conversation agent cannot ask whether the user would like to conference in a plumber.

Existing conversational agents have skills that are highly specific, such as, for example, an ability to invoke an action such as ordering food or making a reservation at a specified restaurant using WWW protocols. However, the conversational agents are not able to interact or act in a generalized sense, such as, for example, to order a pizza, or receive (or transmit) data or command signals from (or to) a particular CRA that is connected to a network, such as, for example, an IoT device or a communicating device. External actions require specific knowledge that is local to the skill and the user cannot interact in a generalizable fashion that builds the external connection details dynamically.

The shortcomings of existing conversational agents is compounded by the head-spinning rate at which different types of CRAs are being created and put into use around the world. For example, buildings of many kinds are increasingly being instrumented with CRAs that include sensor devices and computing devices for such functions as energy use optimization, environment control, water and air quality, occupant presence detection, safety and security. It is generally expected that these types of CRAs and the associated networks, both wired and wireless, will continue to be widely deployed by building developers, owners, managers, and occupants.

While many CRAs or networks can be accessed directly or over a network, such as, for example, the Internet, this is not always a convenient mode of use, as the interaction generally requires the user to have access to hardware such as a user interface, including, for example, a display, a keyboard and a pointing device. For many use cases, a voice interface can be easier and more convenient for the user to interface or interact with the CRAs.

This disclosure provides a broad intelligence system and methodology, including a broad intelligence platform, that can include fully generalized automatic speech recognition (ASR) and intent and context understanding that allows users to use natural language to interface and interact with diverse CRAs to invoke broad-intelligence (BI) actions not previously possible. In certain embodiments, the CRAs can include, for example, application specific integrated circuits (ASICs), IoT devices, sensor hardware devices, control hardware devices, computing devices, communication devices or computer resources.

Various embodiments of a BI system are disclosed that can be arranged to interface and interact with programmable telephony platforms and manipulate individual call sessions (or call legs), including, for example, recording conversations and providing "proof of alert" sent details. In certain embodiments, the BI system can be configured to monitor building systems via the CRAs and facilitate the predictive maintenance (including, for example, preventive and/or reactive maintenance) process by allowing, for example, a building manager, landlord, owner or occupant to have immediate insight into the status of the building's systems without being dependent on access to a display screen. In certain embodiments, the BI system can be configured to provide automated correction of building systems so as to, for example, adjust the building systems to a predetermined range of values or a setpoint value for a given parameter, such as, for example, temperature, pressure, humidity, luminosity, air flow, air quality, water flow, or water quality.

In various embodiments, the BI system can be configured to execute a computer-implemented method for receiving an inbound call to a destination phone number, or making an outbound call to a user device 10. The method comprises providing a domain-specific AI avatar associated with an outbound call and initiating the outbound call to a user device. The method comprises interacting, via the AI avatar, with the user device and authenticating, via the AI avatar, an identity of the user device or a user of the user device. The method can comprise asking, via the AI avatar, for a registered user of the user device before announcing a reason for the call.

FIG. 1 shows a block diagram of a non-limiting embodiment of an environment 1 comprising a broad intelligence (BI) system 100 constructed according to the principles of the disclosure. The environment 1 includes one or more user devices 10, one or more computer resource assets (CRAs) 20, a network 30 and the BI system 100. The network 30 can be configured to connect to the Internet, or the network 30 can be included in or include the Internet.

The user device 10 can include a communicating device such as, for example, a cellphone, a smartphone, a computer tablet, or a portable communicating device capable of interaction with a user and the CRAs 20, network 30 or BI system 100.

The CRA 20 can include an IoT device, a sensor device, a communicating device, a computing device or a computing resource. The CRA 20 can include hardware or a computing resource that can be configured to detect, measure, monitor, adjust, or control any parameter relating to a location, structure, or manmade or naturally occurring condition or material, including, for example, temperature, pressure, humidity, luminosity, voltage, current, motion, flux, or concentration. The parameter can relate to a condition or property such as, for example, electric, magnetic, electromagnetic, chemical, gas, organism (for example, protist, animal, plant, fungi, virus, bacteria), molecular, or atomic. The material can include any combination of a solid, liquid, or gas. The parameter can include, for example, position, orientation in space, direction of motion, speed, velocity, pressure, temperature, humidity, luminosity, or any other measurable condition, state, or characteristic of matter, or a change or rate of change in any of the foregoing. One or more of the CRAs 20 can be included in, on, or near, for example, a device, a building, a facility, a plant, or any other physical structure or location.

Figure 2:
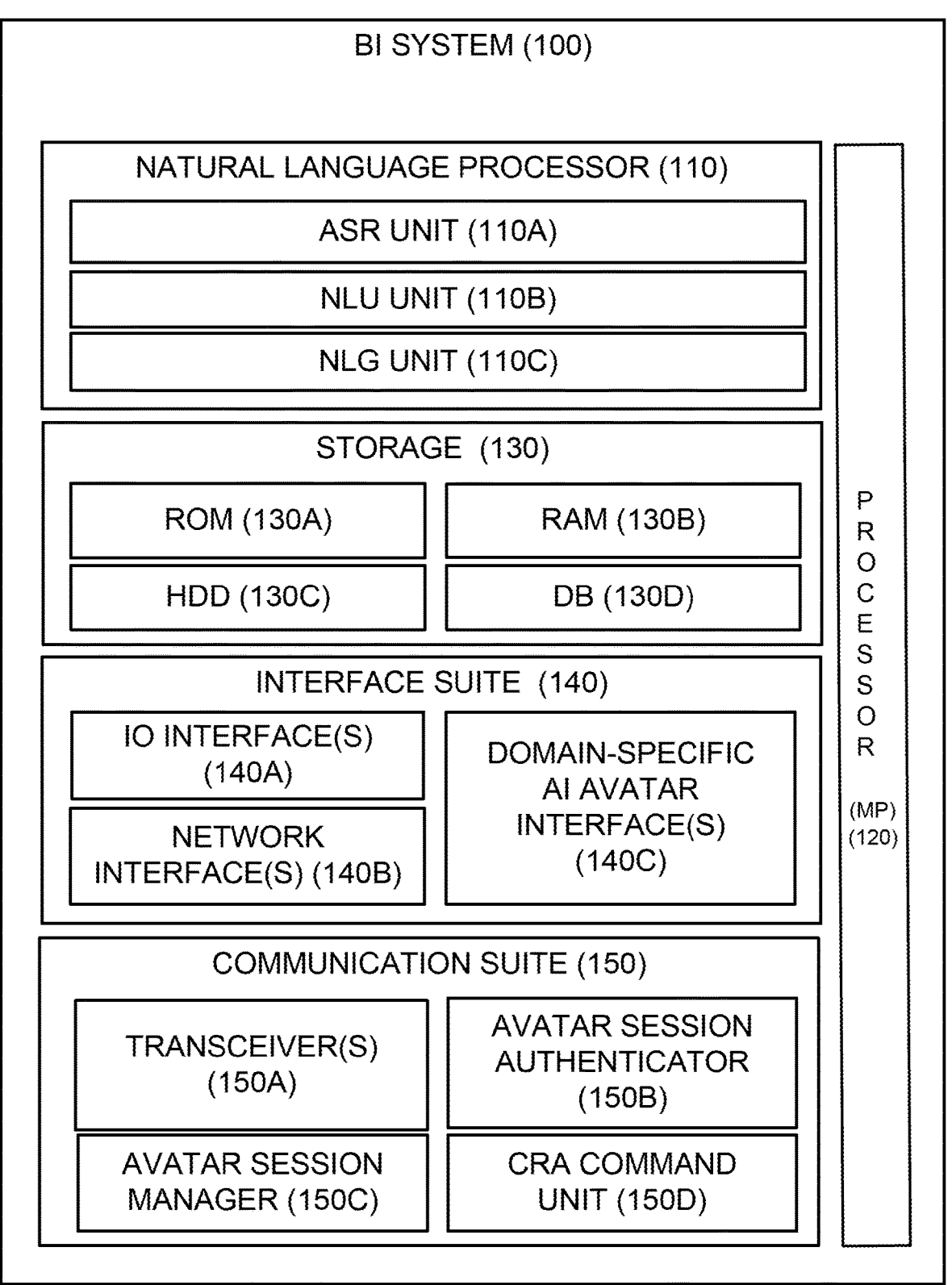
FIG. 2 illustrates a block diagram of an embodiment of the BI system, constructed according to the principles of the disclosure.

FIG. 2 shows a block diagram of a non-limiting embodiment of the BI system 100, constructed according to the principles of the disclosure. The BI system 100 can include a natural language processor (NLP) 110, a processor (MP) 120, a storage 130, an interface suite 140, and a communication suite 150.

In an embodiment, the NLP processor 110 can be comprised in the MP 120.

In an embodiment, the MP 120 can be configured to operate as the NLP processor 110, for example, by executing one or more computer resources on the MP 120. The computer resources can be stored in and retrieved from the storage 130.

The MP 120 can include any of various commercially available processors, multi-core processors, microprocessors or multi-processor architectures.

In various embodiments, the BI system 100 can include one or more servers. In an embodiment, the BI system 100 can be included in one or more servers as one or more computer resource assets.

The BI system 100 can include a bus (not shown). In various embodiments, the bus (not shown) can connect to each of the components, including, for example, the NLP 110, processor 120, storage 130, interface suite 140, and communication suite 150, and facilitate communication and interaction between any of the computer resource assets (or components). The bus (not shown) can be any of several types of bus structures that may further interconnect to a memory bus (with or without a memory controller), a peripheral bus, and a local bus using any of a variety of commercially available bus architectures.

In various embodiments, the NLP 110 can include a machine learning platform, including, for example, one or more supervised machine learning systems or one or more unsupervised machine learning systems, or a combination of supervised and unsupervised machine learning systems. The machine learning platform can include, for example, a neural network, a deep neural network, a Word2vec deep neural network, an artificial neural network (ANN), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning.

The NLP 110 can include one or more computing resource assets, including an automatic speech recognition (ASR) unit 110A, a natural language understanding (NLU) unit 110B, and a natural language generation (NLG) unit 110C. Any one or more of the ASR unit 110A, the NLU unit 110B, and the NLG unit 110C can include a supervised machine learning system, an unsupervised machine learning systems, or any combination thereof.

In various embodiments, the ASR unit 110A can include a hidden Markov model, dynamic time warping (DTW), a deep feedforward neural network, or a recurrent neural network (RNN), or a combination of one or more of the foregoing. The ASR unit 110A can be configured for automatic speech recognition, including end-to-end automatic speech recognition, and interactive voice response (IVR). The ASR unit 110A can be configured to interact with a user at the user device 10 and analyze speech content in the signal received from the user device 10, including each phoneme. The ASR unit 110A can be configured to analyze each sound in the received signal, including, for example, frequency (or pitch), time period, duration, amplitude (or loudness), wave form, and timbre, and recognize (or predict) whole words and sentences to "understand" the speech content and respond to the user utilizing spoken words, which are generated by the BI system 100 and transmitted to the user device 10. The ASR unit 110A can communicate with the NLU unit 110B and NLG unit 110C, including, for example, forwarding words and sentences that were recognized (or predicted) in the received signal by the ASR unit 110A.

In various embodiments, the NLU unit 110B can include a language lexicon (such as, for example, Wordnet), a parser and grammar rules to break words or sentences into one or more internal representations. The NLU unit 110B can be configured to perform semantic analysis, such as, for example, naive semantic analysis or stochastic sematic analysis. The NLU unit 110B can be configured to perform logical inferences, such as, for example, by mapping a derived meaning into a set of assertions in predicate logic, then using logical deduction to arrive at conclusions. In certain embodiments, the NLU unit 110B can be configured to perform intent recognition, where "intent recognition" can be defined as mapping an utterance to a specific intent upon which the system takes subsequent action.

In various embodiments, the NLG unit 110C can include one or more chatbots. The NLG unit 110C can include, for example, one or more computer resources configured for content determination, document structuring, aggregation, lexical selection, referring expression generation, realization, and text to speech generation.

In various embodiments, the BI system 100 can utilize one or more of the individual components of the NLP 110—for example, the ASR unit 110A, the NLU unit 110B, or NLG unit 110C— in concert to provide the interactive avatar and the broad intelligence of the artificial intelligence avatar (or conversational AI agent), such as, for example, when it is in a conversation in a phone session.

Figure 4:
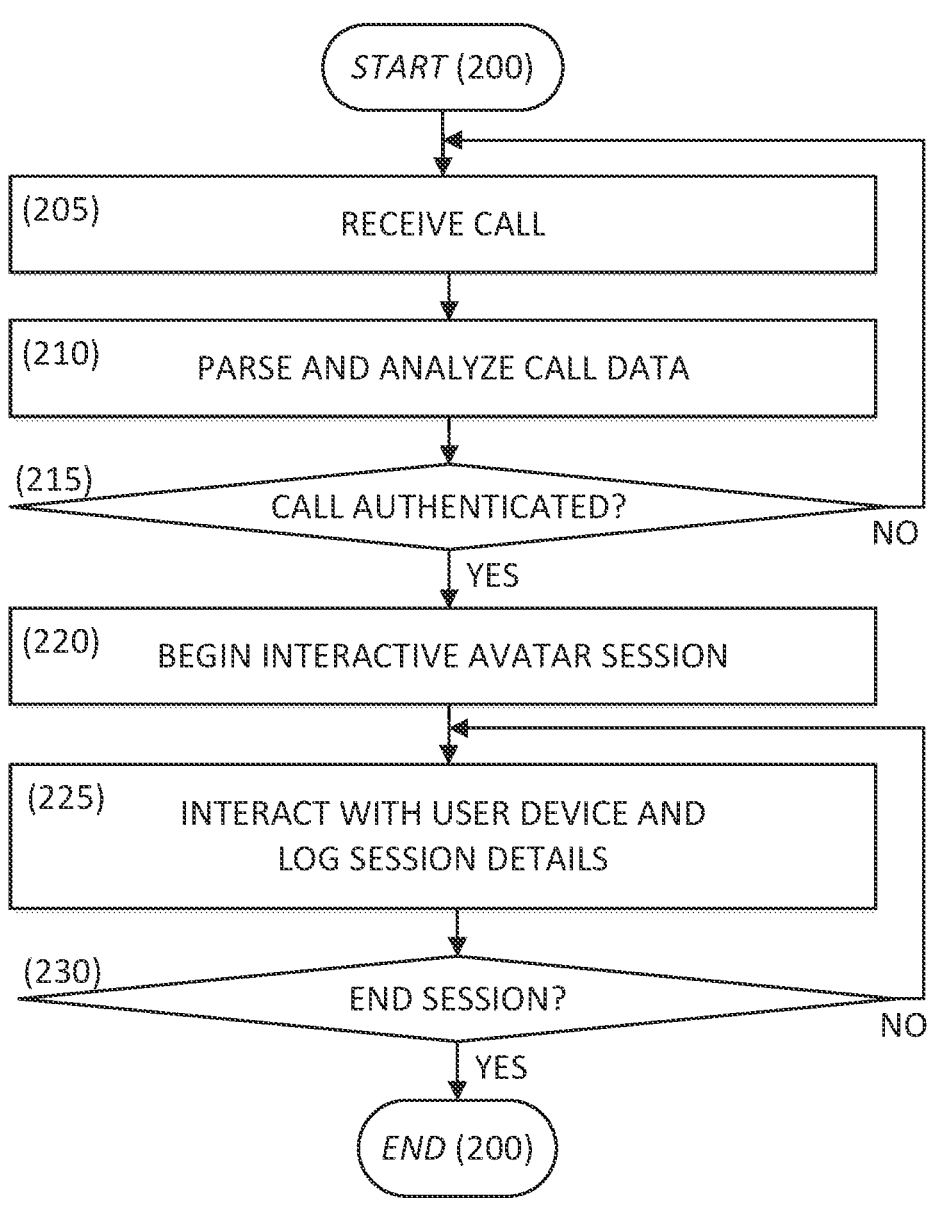
FIG. 4 illustrates an embodiment of computer-implemented process that can be carried out by the BI system, according to the principles of the disclosure.

The BI system 100 can include a non-transitory computer-readable storage medium that can hold executable or interpretable computer resources, including computer program code or instructions that, when executed by the NLP 110 and/or MP 120, cause the steps, processes or methods in this disclosure to be carried out, including the computer-implemented process 200 (shown in FIG. 4). The computer-readable storage medium can be contained in the storage 130.

The storage 130 can include a read-only memory (ROM) 130A, a random-access memory (RAM) 130B, a hard disk drive (HDD) 130C, and a database (DB) 130D. The storage 130, including computer-readable media, can be arranged to provide nonvolatile storage of data, data structures, and computer-executable instructions. The storage 130 can accommodate the storage of any data in a suitable digital format. The storage 130 can include computing resources that can be used to execute aspects of the architecture included in the BI system 100, including, for example, a program module, an application program, an application program interface (API), or program data. In a non-limiting embodiment, the storage 130 can contain computer resources that are executable on the NLP 110 or the MP 120 to carry the processes and functions disclosed herein. One or more of the computing resources can be cached in the RAM 130B as executable sections of computer program code or retrievable data.

In various embodiments, the computing resources can include an API such as, for example, a web API, a simple object access protocol (SOAP) API, a remote procedure call (RPC) API, a representation state transfer (REST) API, or any other utility or service API.

In various embodiments, the storage 130 includes a non-transitory computer-readable medium that holds the computer resources (including code or instructions) that can be executed (run) or interpreted by the operating system on the NLP 110 or the MP 120. The computer-readable medium can be contained in the HDD 130C.

A basic input-output system (BIOS) can be stored in the non-volatile memory in the storage 130, which can include, for example, the ROM 130A. The ROM 130A can include, a ROM, an erasable programmable read-only memory (EPROM), or an electrically erasable programmable read-only memory (EEPROM). The BIOS can contain the basic routines that help to transfer information between any one or more of the components in the BI system 100 such as during start-up, including, for example, any of the components 110 to 140 (shown in FIG. 2).

The RAM 130B can include a dynamic random-access memory (DRAM), a synchronous dynamic random-access memory (SDRAM), a static random-access memory (SRAM), a non-volatile random-access memory (NVRAM), or another high-speed RAM for caching data.

The HDD 130C can include, for example, an enhanced integrated drive electronics (EIDE) drive, a serial advanced technology attachments (SATA) drive, or any suitable hard disk drive for use with big data. The HDD 130C can be configured for external use in a suitable chassis (not shown). The HDD 130C can be arranged to connect to the bus (not shown) via a hard disk drive interface (not shown). In a nonlimiting embodiment, the HDD 130C can include the NLP 110.

The DB 130D can be arranged to be accessed by any one or more of the components in the BI system 100. The DB 130D can be arranged to receive a query and, in response, retrieve specific data, data records or portions of data records based on the query. A data record can include, for example, a file or a log. The DB 130D can include a database management system (DBMS) that can interact with the components 110 to 140. The DBMS can include, for example, SQL, NoSQL, MySQL, Oracle, Postgress, Access, or Unix. The DB 130D can include a relational database.

The DB 130D can be configured to contain information about each domain-specific avatar, each of which can be uniquely configurable. Each domain-specific avatar can be configured to process complex information and make it available through a natural language (for example, English) interface upon user request. A natural language interface can be included for each language used by users of the user devices 10, which can include, for example, all (or less than all) of the languages spoken in the world. The natural language interface(s) can be included in the interface suite 140, such as, for example, in one or more domain-specific artificial intelligence (AI) avatar interface(s) 140C.

In various embodiments, the DB 130D can be arranged to contain information about each communicating device 10 (shown in FIG. 1), each CRA 20 (shown in FIG. 1), and the network 30, including, for example, specification data, an Internet Protocol (IP) address, a media access control (MAC) address, a telephone number, or another electronic address at which the computer resource asset or node can be accessed.

The DB 130D can be arranged to store historical data, including queries. The DB 130D can include device profile data for each CRA 20, including, for example, installation date, life expectancy, most recent and next scheduled inspection date, previous problem reports and so on. The DB 130D can be arranged to be accessed by any one or more of the components in the BI system 100, including the NLP 110 or MLP 120. The DB 130D can be arranged to receive a query and, in response, retrieve specific records or portions of records based on the query. A record can include, for example, a file or a log. Access to data in the DB 130D can be triggered, for example, by the ASR unit 110A and the recognition of specific intents in a conversational interaction.

In various embodiments, the interface suite 140 can include one or more input-output (IO) interfaces 140A, one or more network interfaces 140B, one or more domain-specific AI avatar interfaces, one or more audio-video (A/V) drivers (not shown), and one or more user interfaces (not shown). The interface suite 140 can be configured to receive, transmit or exchange data and command signals with each user device 10 (shown in FIG. 1) and CRA 20 (shown in FIG. 1), including speech content, via the communication protocol(s) used by each user device 10 and each CRA 20.

In a non-limiting embodiment, the interface suite 140 can include one or more communication interfaces configured to use unique phone numbers. In the embodiment, a registered user device 10 (shown in FIG. 1) can call a number associated with a location (for example, a residential, commercial, academic, or government location) or CRA 20 and speak with an AI avatar provided by the BI system 100, for example, by a domain-specific AI avatar interface 140C associated with the destination phone number. The AI avatar can call out from this number so that the registered user device 10 gets verification that this is a genuine call and not a robocall or other spam traffic. In various embodiments, the BI system 100 can include a large number of phone numbers, for example, millions or more numbers. A domain-specific AI avatar can be associated with each, or a group of, unique destination phone number(s).

In the embodiment, to provide full interaction with CRAs 20 at the location (for example, building systems and smart devices), the BI system 100 can be configured to generate unique commands for appropriate actions in response to both CRA (for example, automatic responses) and requests from the user devices 10. The BI system 100 can be configured to utilize, for example, IP network and secure HTTP (HTTPS) transport protocols to implement a wide range of interaction and control protocols, and, for older CRAs such as, for example, in commercial buildings, non-IP networking protocols and proprietary transport layers.

In various embodiments, the BI system 100 can be configured to understand all the protocols required by connected or connectable CRAs 20. The BI system 100 can include a security appliance (not shown), which can be configured to ensure the security and auditability of the BI system 100, including all communications with or by the BI system 100.

The input-output (TO) interface 140A can be arranged to receive instructions or data from an operator. In various embodiments, the IO interface(s) 140A can include a natural language interface, with the interface suite 140 including a natural language interface for each spoken language of the users of the user devices 10 (shown in FIG. 1). The IO interface 140A can be arranged to receive (or transmit) speech content, commands or data from (or to) an operator. The IO interface 140A can be arranged to connect to or communicate with one or more input-output devices, including, for example, a keyboard, a mouse, a pointer, a stylus, a microphone, a speaker, an interactive voice response (IVR) unit, a graphic user interface (GUI), or a display device. The IO interface 140A can include a transmitter, a receiver or a transceiver. Signals, including speech content, can be received from any user device 10 in the environment 1 via, for example, the IO interface 140A, and commands or data can be forwarded to any CRA 20 via the IO interface 140A or network interface 140B.

The IO interface 140A can include one or more audio drivers (not shown) and one or more video drivers (not shown). In various embodiments, the audio driver can include a sound card, a sound driver, an interactive voice response (IVR) unit, or any other device necessary to render a sound signal on a sound production device, such as for example, a speaker. The video driver can include a video card, a graphics driver, a video adaptor, or any other device necessary to render an image signal on a display device.

The network interface 140B can be arranged to connect to one or more communicating devices via the network 30, including the user devices 10 (shown in FIG. 1). The network interface 140B can be arranged to connect to the Internet or any wired and/or wireless network. The network interface 140B can include a modem, a transmitter, a receiver or a transceiver. The network interface 140B can include a wired or a wireless communication network interface. When used in a local area network (LAN), the network interface 140B can be arranged to include a wired or wireless communication network interface that can connect to the LAN; and, when used in a wide area network (WAN), the network interface 140B can be arranged to include a modem to connect to the WAN network. The modem can be internal or external and wired or wireless. The modem can be connected to the bus via, for example, a serial port interface.

The domain-specific AI avatar interface(s) 140C can be included as one or more computer resources in the interface suite 140, such that each destination phone number is associated with a domain-specific AI avatar. In various embodiments, the AI avatar can be generated by, or operated under the control of, the NLP 100 or MP 120 and interact with the user devices 10 via the AI avatar interface(s) 140C.

The communication suite 150 can include one or more transceivers 150A, an avatar session authenticator 150B, an avatar session manager 150C, and a computer resource asset (CRA) command unit 150D. Each transceiver 150A can include a transmitter and a receiver arranged to transmit and receive communication signals, respectively. The communication signals can include, for example, voice-over-Internet Protocol (VoIP) signals, public switched telephone network (PSTN) signals, cellular telephone signals, or other electronic signals capable of carrying voice signal data.

The avatar session authenticator 150B can be configured to authenticate the credentials for each user device 10 (shown in FIG. 1) that communicates with the BI system, to ensure security of all communications to and from the BI system 100. The credentials can include (for each user device 10), for example, an automatic number identification (ANI), telephone number, IP address, or MAC address, or user information, such as, for example, telephone number, email address, account name, or password of the user of the user device 10. The avatar session authenticator 150B can be configured to interact with and query the DB 130D to authenticate an incoming communication signal, such as, for example, an incoming telephone signal.

In an embodiment, the avatar session authenticator 150B is arranged to parse a unique phone number from a signal received from a user device 10, query the DB 130D for a record associated with the phone number, and authenticate the user device 10 or the received signal based on a response from the DB 130D to the query. In various embodiments, the parsed phone number can include at least one of an origination phone number of the user device 10 and a destination phone number associated with one or more CRAs 20 connectable to the BI system 100. If a record is contained in the DB 130D having a phone number that matches the phone number in the received signal, a phone number match can be determined by the avatar session authenticator 150B and an authentication confirmation sent to the avatar session manager 150C to initiate an avatar session with the user device 10 from which the signal was received.

The avatar session manager 150C can be arranged to initiate an avatar session, such as, for example, in response to receiving the authentication confirmation from the avatar session authenticator 150B, and manage the life cycle of the avatar session from beginning to its conclusion, at which point the avatar session can be terminated and the details of the avatar session stored in the storage 130 (for example, in the DB 130D) as a session data record for the particular avatar session. The session data record can include, for example: the start and stop times of the session; all (or any portion) of the spoken content in the session; the ANI, telephone number, IP address, MAC address, or other identifier of the user device 10 with which the BI system 100 interacted with during the session; the IP address, MAC address or other identifier of each CRA 20 with which the BI system 100 interacted with in relation to the session; the signals and data that were received from each CRA 20 in relation to the session; and the commands and data that were generated by the CRA command unit 150D and sent to each CRA 20 in relation to the session.

The CRA command unit 150D can be configured to interact with each CRA 20 in the environment 1 (shown in FIG. 1). The CRA command unit 150D can be configured to receive signals and data from any CRA 20 and transmit commands and data to any CRA 20 in the environment 1. In certain embodiments, the CRA command unit 150D can be configured to receive sensor signals and sensor data from devices, such as, for example, IoT sensor devices, including, for example, a temperature value, a velocity value (for example, magnitude and direction), a pressure value, a humidity value, a luminosity value, an air flow value (for example, magnitude and direction), an air quality value (for example, pollutants or microbes per unit of area), a liquid flow value (for example, magnitude and direction of water flow), a liquid quality value (for example, pollutants or microbes per unit of area), or any other measurable characteristic or condition that can be adjusted or controlled in response to, for example, an electric signal, infrared (IR) signal, or any signal that can be generated by a CRA driver using the electromagnetic spectrum.

Figure 3:
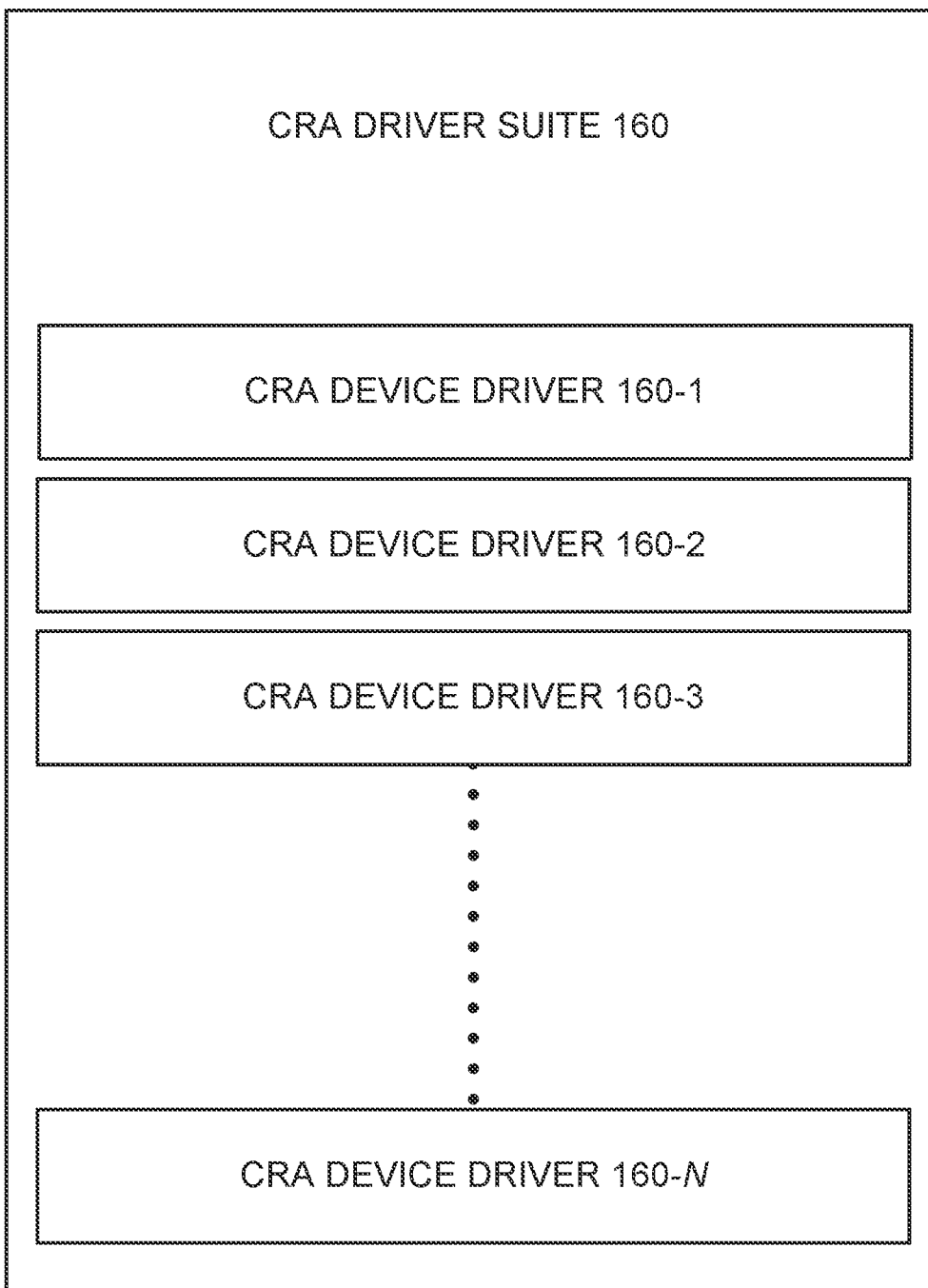
FIG. 3 illustrates a block diagram of an embodiment of a computer resource asset driver suite that can be included in the BI system.

FIG. 3 shows a block diagram of a non-limiting embodiment of a CRA driver suite 160 that can be included in the BI system 100 (shown in FIG. 2). In a non-limiting embodiment, the CRA driver suite 160 can be included in the CRA command unit 150D. The CRA driver suite 160 can include a plurality of CRA device drivers 160-i (for example, 160-1, 106-2, 160-3, . . . , 160-N where i and N are positive integers, i being greater than 0 and N being greater than 3). Each CRA device driver 160-i can be configured to operate between the CRA command unit 150D (shown in FIG. 2) and a respective CRA 20 (shown in FIG. 1). In various embodiments, the CRA device driver 160-i can be configured to operate as an interface one or more CRAs 20 and generate commands to operate, or control hardware functions of, a particular CRA 20. The CRA device driver 160-i can be configured to respond to a call, for example, from the processor 110 or MP 120, and send a command to the CRA 20. The CRA device driver 160-i can be configured to receive data from the CRA 20 and forward the data to one or more components in the BI system 100.

In a non-limiting embodiment, the CRA device driver 160-i can be included in the CRA 20 (shown in FIG. 1). In another embodiment, the CRA device driver 160-i can be configured to interact with a device driver (not shown) in the CRA 20.

In various embodiments, the BI system 100 is configured to execute a computer-implemented method, including a computer-implemented method to authenticate a call. Referring to FIGS. 1 and 2, the method comprises receiving a call from a user device 10 and authenticating the call by the NLP 110 configured to apply at least one authentication technology. The NLP 110 can be configured to generate an artificial intelligence avatar associated with the call and interacting, via the artificial intelligence avatar, with the user device 10 using conversational language. The NLP 110 can be configured to exchange data or commands with at least one CRA 20 based on the interaction using conversational language, including, for example, at least one IoT device, sensor device, or controller.

In certain embodiments, the NLP 110 can be configured to apply an HTTP (Hypertext Transfer Protocol) authentication technology, including, for example, at least one of basic HTTP authentication, bearer (or token) authentication, digest access authentication, or mutual authentication.

In certain embodiments, the NLP 110 can be configured to apply a shared-secrets or a limited time-to-live authentication token.

In certain embodiments, the NLP 110 can be configured to apply voice print authentication technology. The voice print authentication technology can include comparing a voice signature to a stored voice signature. The computer-implemented method executed by the BI system 100 can include terminating the call based on a result of comparing the voice signature to the stored voice signature.

In certain embodiments, the voice signature comprises a voice print, and the call is terminated when a user's voice does not match a stored voice signature corresponding to the user.

In various embodiments, the BI system 100 can be configured to receive data from a network of CRAs 20, such as, for example, in commercial buildings, private residences, academic and industrial clean rooms, manufacturing plants, or any other facility or structure, and collect and aggregate the data via, for example, a variety of wireless edge infrastructure protocols. The BI system 100 can be configured to store the data in the storage 130 or a secure, private cloud data repository, and subsequently analyze and index the data for response to different queries and defined context uses. In an embodiment, the BI system 100 can be configured, upon being contacted by an authorized user (for example, a building manager, landlord, laboratory manager or homeowner), to hold a natural conversation with the user whereby the user can query for data about individual CRAs 20 or ask for an overall state of the system or network of CRAs 20, and any anomalous events occurring in the locations and structures being monitored by the CRAs 20. The BI system 100 can be configured to initiate actions on behalf of an authorized user to adjust, for example, building system states.

In an embodiment, the NLP 110 and MP 120 can have access to data in the DB 130D, such as, for example, the device profile data for each CRA 20, including, for example, installation date, life expectancy, most recent and next scheduled inspection date, and previous problem reports. Access to this data can be triggered by the ASR unit 110A and the recognition of specific intents in the conversational interaction.

The BI system 100 can include the security appliance mentioned earlier. The security appliance (not shown) can be configured to provide complete communication privacy for each communication with a user device 10. The BI system 100 can be configured to invoke an AI avatar only when a user explicitly calls it using a unique destination telephone number, or when the AI avatar proactively calls out (or sends a text message) to an authorized user device 10 in the event of an alert or emergency. In both cases, the conversation between the AI avatar and the user can be end-to-end encrypted throughout its transport over the network 30, which can include a cellular or satellite radio network.

In various embodiments, the avatar session manager 150C (shown in FIG. 2) can be configured to interface and interact with programmable telephony platforms and manipulate individual call sessions (call legs), including, for example, recording conversations and providing "proof of alert" sent details. The BI system 100 can be configured to monitor building systems via the CRAs 20 and facilitate the predictive maintenance (including, for example, preventive and/or reactive maintenance) process by allowing, for example, a building manager, landlord or owner to have immediate insight into the status of the building's systems without being dependent on access to a display screen. The BI system 100 can be configured to provide automated correction of building systems so as to, for example, adjust the building systems to a predetermined range of values or a setpoint value.

In various non-limiting embodiments, the environment 1 can include, for example, renter-occupied residential units (both single and multi-unit properties), owner-occupied residential units, commercial buildings of a variety of types and uses (for example, multifamily residential, office, retail, healthcare, specialty, sports, hospitality, industrial, flex, self-storage, towers, plants, and facilities), aircraft, automotive, research, utilities, or manufacturing.

The BI system 100 can be configured to interface and interact with smartphone-based voice assistants, automotive voice control systems, smart TVs and wearables, to name only a few use cases.

In a non-limiting embodiment, the BI system 100 can be configured to assign a unique destination phone number as a communication interface. In this embodiment, a user device 10, which can be, for example, associated with a registered user, can call the destination phone number associated with a particular location, building or structure and speak with an AI avatar provided by the BI system 100. The BI system 100 can be configured to have the AI avatar call out from this number to the user device 10 so that the registered user gets verification that this is a genuine call and not a robocall or other spam traffic. The BI system 100 can include a destination phone number for each CRA 20, or location having one or more CRAs 20.

The BI system 100 can be configured to fully interface and interact with CRAs 20, including building systems comprising one or more CRAs 20. The BI system 100 can be configured to generate and send appropriate commands for each action in response to either or both CRA 20 (automatic responses) and user device 10 requests. Modern building systems and smart devices generally use an IP network and secure HTTP (HTTPS) transport but implement a wide range of interaction and control protocols. Older systems in, for example, commercial buildings, can use non-IP networking protocols and proprietary transport layers. The BI system 100 can be configured to understand all the protocols required by connected or connectable CRAs 20 or user devices 10.

In certain embodiments, the BI system 100 can be configured to interface and/or interact with a plethora of protocols in the IoT device area at the transport layer, including, for example, Matter, ZigBee, NB-IoT, LoRa, Z-Wave, Thread, and X-10, to name only a few.

In certain embodiments, the BI system 100 can be configured to interface and/or interact with a plethora of protocols in the IoT device area at the application layer, including, for example, Web Services, HTTP/S, CoAP, etc., where information can be encoded in different data representation formats, such as, for example, through JSON, CSV, TLV, XML, etc.

In certain embodiments, the BI system 100 can be configured to interface and/or interact with a "master" protocol in the IoT device area at the application layer that interfaces with the different protocols and data representation formats to create a canonical representation of the information arriving from IoT devices. In this regard, all computation can be performed on this canonical representation; and, when the BI system 100 wants to send out a response to a particular IoT device, the "master" protocol can distill the canonical representation into a specific protocol to send it to that device.

The BI system 100 can be configured to ensure the security and auditability of all communications handled by the BI system 100. In certain embodiments, accounting and auditability can be accomplished by the BI system 100 logging any and all communications over the communications links. These logs can be stored in any of the subsystems specified in storage 130 or to any computing device configured to accept this logging data outside of the BI System 100, including but not limited to cloud storage, user device 10, authorized/secured user computers. Contents of the logged data can be any portion of data coming into or out of the BI system 100, including, for example, but not limited to, user device 10, CRA 20 or any external network connected computing devices.

In certain embodiments, BI system 100 can contain a hierarchy of policies that can be applied, for example, when authenticating a caller or when a party that picks up the phone when the BI system 100 makes an outbound call. Communications to/from the BI system 100 can be run over encrypted protocols such as, for example, but not limited to, HTTPS, SSL, and TLS.

In a non-limiting embodiment, the BI system 100 can be configured with a capability to continue conversations across different modalities. For example, a user device 10 can interact with the BI system 100 through a text messaging, and then subsequently switch to a voice call. The BI system 100 can be configured to maintain a list of CRAs 20 associated with, for example, a destination phone number, user, user device 10, location, or structure. The avatar session manager 150C, in the BI system 100, can be configured to maintain state information related to each call session; thus, when a user device 10 interacts with the BI system 100 via text messaging and affects some action, the BI system 100 remembers this. When the user device 10 subsequently calls in, the BI system 100 can continue from where the user device 10 last interacted. For example, where a person tries to reserve a spot in a clean room and halfway through the conversation they hang up for some reason, then, when they dial in again, they could be prompted to confirm/complete their incomplete reservation.

FIG. 4 shows a non-limiting embodiment of computer-implemented process 200 that can be carried out by the BI system 100, according to the principles of the disclosure. The process 200 can be implemented by the system 100 to interact with one or more CRAs 20 (shown in FIG. 1) at a smart-location or smart-structure such as, for example, a smart-home or smart building, to provide voice-enabled interaction between one or more user devices 10 (shown in FIG. 1) and an AI conversational avatar to control one or more parameters at the smart-location or smart-structure.

In various embodiments, the smart-location or smart-structure can in include a plurality of CRAs 20 comprising various IoT devices. The BI system 100 can provide configurable domain-specific AI conversational avatars that can process complex information and monitor, control, and manage parameters of the CRAs 20 at the location through interact with the user device 10.

Referring to FIGS. 1, 2 and 4, the BI system 100 (for example, communication suite 150) can receive a call from a user device 10 (Step 205). In an embodiment, a user can call a particular destination phone number associated with one or more CRAs 20 using a user device 10 and be connected to a domain-specific avatar corresponding to the CRA(s) 20. Call data can be parsed from the call signal and analyzed by, for example, the avatar session authenticator 150B (Step 210). In the analysis, the origination phone number of the user device 10 can be parsed from the call signal and used, for example, by the avatar session authenticator 150B, to authenticate the user device 10 (Step 215).

In various embodiments, the caller or user device 10 can be authenticated based, for example, on the caller's speech signature, or based on the origination phone number, IP address, or MAC address of the user device 10.

In an embodiment, the call can be authenticated by the AI avatar, via, for example, the avatar session authenticator 150B analyzing the call signal.

In an embodiment, the origination phone number can be compared to one or more registered origination phone numbers, for example, stored in the DB 130D, to determine a match. If a match is determined, then the origination phone number can be authenticated.

In an embodiment, if no match is determined, then the call can be redirected to a registration process by which the BI system 100 can register the user, user device, or origination phone number.

In an alternative embodiment, if no match is determined, the call can be terminated.

If the call is authenticated (YES at Step 215), then an interactive avatar session with the domain-specific AI avatar can be initiated, for example, by the avatar session manager 150C (Step 220), otherwise the call can be redirected, or it can be terminated, and the process can receive another call (Step 205).

During the interactive avatar session (Step 225), the AI avatar can interact with the user device 10 using spoken words and sounds and the user (via the user device 10) can, for example, ask questions, request confirmations, and get confirmations using spoken words or sounds. The AI avatar can be configured to process complex information, including, for example, data received from one or more CRAs 20, and make the information available to the user device 10 in spoken language. The call session details can be logged and stored in the storage 130, for example, in the DB 130D. The session logs can be associated with, and indexed to, for example, the destination phone number, the origination phone number, the user device 10, the user, the CRA 20, or the location of one or more CRAs 20.

In various embodiments, in response to interaction with the user device 10 during the call session, AI avatar can interact with the CRA command unit 150D to generate and transit commands to the one or more CRAs 20. In response to the commands, the CRA 20 can send status and operational data to the AI avatar, via, for example, the communication suite 150 (for example the avatar session manager 150C), which can then be analyzed and communicated as spoken words or sounds in the call signal to the user device 10 during the session, or at a later time pursuant to, for example, a schedule. In an embodiment, the status and operation data can be sent to the user device 10 during the session, or at some other time, as an audio/visual signal, such as, for example, a sound, a text message, or an image signal (for example, a dynamic or still video).

In response to the commands received from the BI system 100, the CRA 20 can adjust or control one or more functional parameters of the CRA, such as, for example, an operation of the CRA 20. The operation of the CRA 20 can include, for example, an adjustment or control of a condition at a particular location, such as, for example, adjusting a setpoint value such as a temperature value on an HVAC system or a setpoint voltage on an electric transformer. A variety of other implementations are contemplated herein, as will be appreciated by those skilled in the art.

The following is a non-limiting example of an interactive avatar session between a user (via a user device 10) and a domain-specific AI avatar:

Human: Hi, what's the status of the house?

AI Avatar: All systems are normal, nothing out of ordinary to report.

Human: What is the status of the sump pump?

AI Avatar: The sump pump is operating normally. It is running every 30 minutes.

Human: when was the pump installed?

AI Avatar: The pump was installed on Oct. 2, 2014 at 10:10

Human: What's is its life expectancy?

AI Avatar: Based on the usage of the pump, this particular brand should be good till Mar. 9, 2025.

Human: Setup a calendar notice for me to look at the pump on Mar. 6, 2022

AI Avatar: Done. Anything else?

Human: What is the temperature in the living room?

AI Avatar: Current Temperature in the living room is 76 degrees.

Human: Family room?

AI Avatar: Family Room is 68 degrees.

Human: Is there anyone in the house?

AI Avatar: There is no one in the house right now. Would you like me to turn down the temperature?

Human: Yes. Please reduce the temperature in all rooms to 70 degrees.

AI Avatar: Done. Anything else?

Human: No, that's it for now.

AI Avatar: Bye.

The AI avatar can determine whether the session has ended or should end based on the conversation with the user (Step 230). If a session end is determined, the AI avatar can, via the avatar session manager 150C, terminate the session (YES at Step 230) and end the call, otherwise the session can continue (NO at Step 230). Based on the conversation between the user and the AI avatar during the interactive avatar session, the AI avatar can schedule one or more actions, including, for example, scheduling or following up with a call to the user device 10, scheduling or transmitting a notification (for example, audio-visual message) related to one or more CRAs 20 to the user device 10.

In various embodiments, the AI avatar can call out to the user device 10 with notifications such as, for example, status, alerts, or emergency messages, on a scheduled, ad hoc, or detected basis, such as, for example, in response to sensor signals received from one or more CRAs 20 associate with, and managed by, the AI avatar.

In various embodiments, the domain-specific AI avatar for the destination phone number called by the user device 10 can monitor, adjust, control, and manage each of the one or more CRAs 20 that are associated with the destination phone number. In an embodiment, a record for each destination phone number handled by the BI system 100, including device and communication specification data needed to connect and communicate with each CRA 20, can be contained in the DB 130D. The record can further include identification data for the domain-specific AI avatar associated with the destination phone number.

In an embodiment, the BI system 100 can comprise the NLP 110, the storage 130, and the interface suite 140. The interface suite 140 can include a first interface configured to interact with a user device 10, such as, for example, IO interface 140A, network interface 140B, or AI avatar interface 140C. The interface suite 140 can include a second interface configured to interact with at least one CRA 20. The NLP 110 can be configured to: generate an AI avatar associated with a destination phone number; operate the AI avatar and interact with the user device 10 using conversational language; and exchange data or commands with the at least one CRA 20 based on the interaction using conversational language.

In an embodiment, a computer-implemented process can be carried out by the BI system 100, comprising: receiving a call from a registered user device 10, the call including a destination phone number; generating an AI avatar associated with the destination phone number; interacting, via the AI avatar, with the user device 10 using conversational language; and exchanging data or commands with at least one CRA 20 based on the interaction using conversational language.

In an embodiment, a non-transitory computer-readable medium is provided that contains computer-executable instructions that, when executed by the NLP 110 or the MP 120, cause the processor to perform steps comprising: receiving a call from a registered user device 10, the call including a destination phone number; generating an AI avatar associated with the destination phone number; interacting, via the AI avatar, with the user device 10 using conversational language; and exchanging data or commands with at least one CRA 20 based on the interaction using conversational language.

In an embodiment, a computer-implemented process is provided that can be carried out by the BI system 100 for authenticating a call, the process comprising: receiving a call from a user device 10; and authenticating the call by a call authentication computing resource asset configured to apply at least one authentication technology; generating an AI avatar associated with the call; interacting, via the AI avatar, with the user device 10 using conversational language; and exchanging data or commands with at least one CRA 20 based on the interaction using conversational language.

In an embodiment, the call authentication computing resource asset can be configured to apply an HTTP authentication technology, including at least one of a Basic, a Bearer, a Digest, or a Mutual HTTP authentication technology.

In an embodiment, the call authentication computing resource asset can be configured to apply a shared-secrets or a limited time-to-live authentication token.

In an embodiment, the call authentication computing resource asset can be configured to apply voice print authentication technology.

In an embodiment, the voice print authentication technology can include comparing a voice signature to a stored voice signature.

In an embodiment, the call can be terminated based on a result of comparing the voice signature to the stored voice signature.

In an embodiment, the voice signature can include a voice print and the call can be terminated when a user's voice does not match a stored voice signature corresponding to the user.

In an embodiment, a computer-implemented method can be carried out by the BI system 100 for making an outbound call to a user device, the method comprising:

generating an AI avatar associated with an outbound call; initiating the outbound call to a user device 10; interacting, via the AI avatar, with the user device 10; authenticating, via the AI avatar, an identity of a user of the user device 10; and asking, via the AI avatar, for a registered user of the user device 10 before announcing a reason for the call.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" or "communication device," as used in this disclosure, mean any computing device, hardware, or computing resource that can transmit or receive data packets, instruction signals or data signals over a communication link. The communicating device or communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, satellite, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), a data processing unit (DPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer.

For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "computer resource" or "computing resource," as used in this disclosure, mean software, a software application, a web application, a web page, a computer application, a computer program, computer code, machine executable instructions, firmware, or a process that can be arranged to execute on a computing device or a communicating device.

The terms "computer resource process" or "computing resource process," as used in this disclosure, mean a computing resource that is in execution or in a state of being executed on an operating system of a computing device, such as, for example, the NLP 110 or the MP 120 (shown in FIG. 2). Each computing resource that is created, opened, or executed on or by the operating system can create a corresponding computing resource process. A computing resource process can include one or more threads, as will be understood by those skilled in the art.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "transmission," "transmit," or "send," as used in this disclosure, mean the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include air, coaxial cables, copper wire, or fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for interacting with one or more computer resource assets at a location, the method comprising:
   receiving a call from a user device, the call including a destination phone number;
   generating an artificial intelligence avatar associated with the destination phone number;

interacting, via the artificial intelligence avatar, with the user device using conversational language;
   authenticating a user of the user device by comparing a voice signature associated with the user to a stored voice signature corresponding to a user profile associated with the destination phone number and with the artificial intelligence avatar instantiated based on the destination phone number;
   generating, via the artificial intelligence avatar, a command to perform an operation or a function; and
   sending, based on one or more words or sounds spoken during the interaction, the command to a computing resource asset at the location to perform the operation or the function.

2. The computer-implemented method in claim 1, further comprising:
   authenticating the call by the artificial intelligence avatar.

3. The computer-implemented method in claim 1, further comprising:
   authenticating the call by a call authentication computing resource asset configured to apply at least one authentication technology.

4. The computer-implemented method in claim 3, wherein the at least one authentication technology comprises an HTTP authentication technology, including at least one of a Basic, a Bearer, a Digest, or a Mutual HTTP authentication technology.

5. The computer-implemented method in claim 3, wherein the at least one authentication technology comprises a shared-secrets or a limited time-to-live authentication token.

6. The computer-implemented method in claim 3, wherein the at least one authentication technology comprises a voice print authentication technology comprising the comparing the voice signature associated with the user to the stored voice signature.

7. The computer-implemented method in claim 1, further comprising:
   terminating the call based on comparing the voice signature to the stored voice signature.

8. The computer-implemented method in claim 7, wherein the voice signature comprises a voice print, and wherein the call is terminated when a user's voice does not match the stored voice signature corresponding to the user.

9. The computer-implemented method in claim 1, further comprising:
   adjusting a command generation of the artificial intelligence avatar in real time based on retrieved user-specific data and device profile information.

10. A computer-implemented method for interacting with one or more computer resource assets at a location, the method comprising:
   generating an artificial intelligence avatar associated with a destination phone number;
   initiating an outbound call from the destination phone number to a user device;
   interacting, by the artificial intelligence avatar, with the user device using conversational language;
   authenticating, by the artificial intelligence avatar, an identity of a user of the user device by comparing a voice signature associated with the user to a stored voice signature associated with the destination phone number and with the artificial intelligence avatar instantiated based on the destination phone number; and,
   asking, by the artificial intelligence avatar, for a registered user of the user device before announcing a reason for the call.

11. The computer-implemented method in claim 10, further comprising:

adjusting a command generation of the artificial intelligence avatar in real time based on retrieved user-specific data and device profile information.

12. A system for interacting with one or more computer resource assets at a location, the system comprising:

a processor;

a storage; and an interface suite including a first interface configured to communicate with a user device and a second interface configured to interact with at least one computing resource asset at the location, wherein the processor is configured to:

receive a call, via the first interface, from the user device, the call being directed to a destination phone number;

provide a conversational avatar by a machine learning platform based on the destination phone number;

operate the conversational avatar by the machine learning platform to communicate with the user device and interact with a user of the user device using conversational language;

authenticate a user of the user device by comparing a voice signature associated with the user to a stored voice signature associated with the destination phone number and with the conversational avatar instantiated based on the destination phone number;

generate by the machine learning platform a command to perform an operation or a function; and send, based on one or more words or sounds spoken during the interaction with the user, the command to a computing resource asset at the location to perform the operation or the function.

13. The system in claim 12, wherein the processor is further configured to authenticate the call by the conversational avatar.

14. The system in claim 12, wherein the processor is further configured to authenticate the call by a call authentication computing resource asset configured to apply at least one authentication technology.

15. The system in claim 14, wherein the at least one authentication technology comprises an HTTP authentication technology, including at least one of a Basic, a Bearer, a Digest, or a Mutual HTTP authentication technology.

16. The system in claim 14, wherein the at least one authentication technology comprises a shared-secrets or a limited time-to-live authentication token.

17. The system in claim 14, wherein the at least one authentication technology comprises a voice print authentication technology that includes the comparing the voice signature associated with the user to the stored voice signature.

18. The system in claim 12, wherein the processor is further configured to terminate the call based on comparing the voice signature to the stored voice signature.

19. The system in claim 18, wherein the voice signature comprises a voice print, and wherein the call is terminated when a user's voice does not match a stored voice signature corresponding to the user.

20. The system in claim 12, wherein the processor is further configured to adjust a command generation of the artificial intelligence avatar in real time based on retrieved user-specific data and device profile information.

\* \* \* \* \*